United States Patent [19]

Cero, Jr. et al.

[11] Patent Number: 5,341,062
[45] Date of Patent: Aug. 23, 1994

[54] PIEZOELECTRIC ENERGY GENERATOR

[75] Inventors: Joseph T. Cero, Jr., Horsham; Mitchell L. Thompson, Exton, both of Pa.; Joseph K. Hann, II, Newark, Del.

[73] Assignee: The Whitaker Corporation, Wilmington, Del.

[21] Appl. No.: 13,489

[22] Filed: Feb. 1, 1993

Related U.S. Application Data

[63] Continuation of Ser. No. 791,742, Nov. 12, 1991.

[51] Int. Cl.$^5$ ............................................. H01L 41/08
[52] U.S. Cl. ...................................... 310/339; 310/369; 310/800
[58] Field of Search ............... 310/317, 319, 328, 338, 310/339, 366, 800

[56] References Cited

U.S. PATENT DOCUMENTS

| | | | |
|---|---|---|---|
| 3,320,890 | 5/1967 | Ciccone et al. | 310/339 X |
| 3,340,811 | 9/1967 | Gauld | 310/339 X |
| 3,349,709 | 10/1967 | Vilbajo | 310/339 X |
| 3,438,326 | 4/1969 | Thomanek et al. | 310/339 X |
| 3,524,084 | 8/1970 | Horan | 310/339 X |
| 4,469,978 | 9/1984 | Hamada et al. | 310/366 |
| 5,034,648 | 7/1991 | Gastgeb | 310/339 X |

FOREIGN PATENT DOCUMENTS

| | | | |
|---|---|---|---|
| 3833109 | 4/1990 | Fed. Rep. of Germany | 310/328 |
| 0232965 | 11/1985 | Japan | 310/800 |

*Primary Examiner*—Mark O. Budd

[57] ABSTRACT

A ballistic fuse, which converts mechanical energy derived from the initial firing to stored electrical energy used to energize a later detonation, having piezoelectric polymer film strip with oppositely polarized layers on opposite surfaces, is pre-folded end to end before pleating and stacking in order to place both halves of a surface layer of one polarity into mutually contacting relationship, thereby reducing the risk of short circuits, and furthermore to double the bend radius required for pleating, thereby decreasing the risk of hinge failure due to bending stress at the pleated folds, and the continuous pattern of circles joined side by side in each layer is printed with conductive silver ink on the polymer film to eliminate the necessity of joining surfaces of like polarity with individual leads.

9 Claims, 2 Drawing Sheets

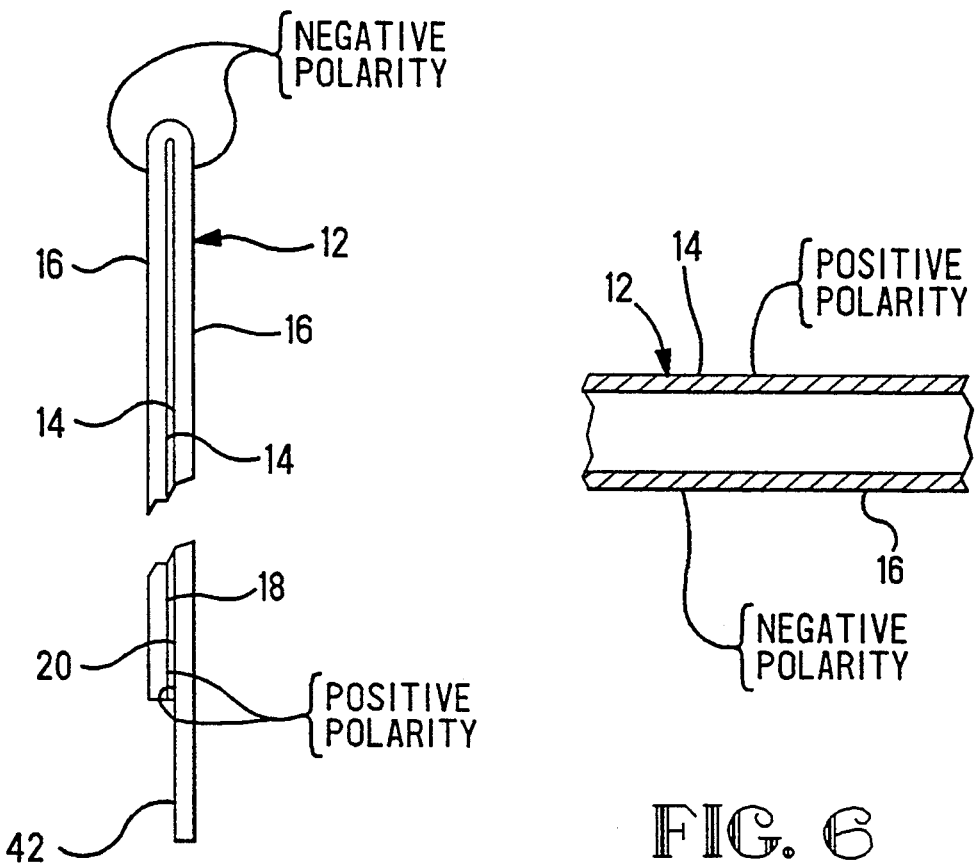
FIG. 4
FIG. 6
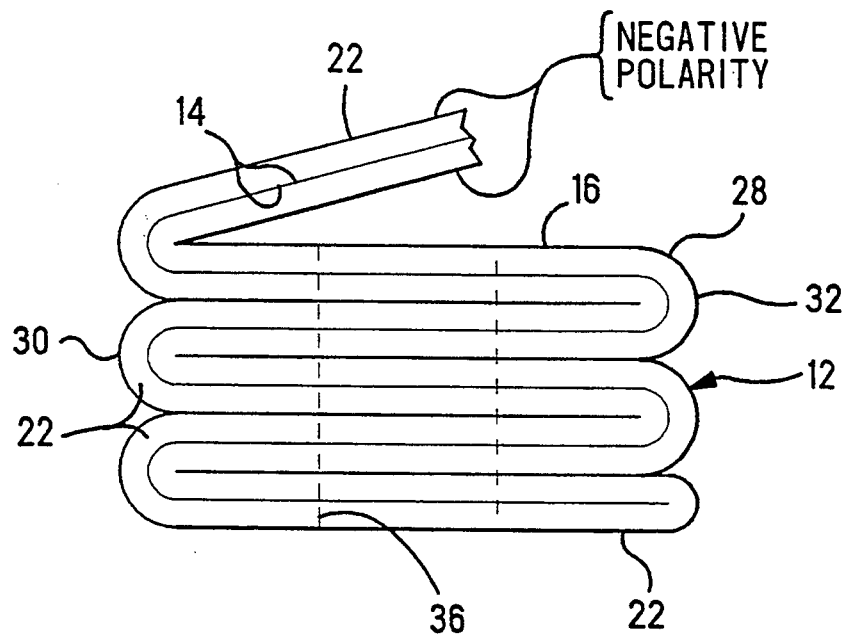
FIG. 5

PIEZOELECTRIC ENERGY GENERATOR

This is a continuation of copending U.S. application Ser. No. 07/791,742, filed Nov. 12, 1991.

BACKGROUND OF THE INVENTION

1. Field of the Invention

This invention relates to energy generation devices, such as a time delay fuse, and more particularly to a device or fuse of that kind made from a piezoelectric polymer film.

In a time-delayed energy system functioning as a fuse in a projectile, it is desired that mechanical energy derived from the initial firing of the projectile be converted to electrical energy and stored with the assistance of a diode for a short period until called upon to energize detonation. A fuse of this kind is required to fit inside a small caliber bullet and remain positioned to energize the so-called secondary detonator situated in the tip of the bullet.

2. Description of the Prior Art

Prior efforts with piezoelectric transducers in fuses for projectiles have been unsuccessful because the transducers have been of the piezoelectric ceramic variety which proved to be fragile and therefore unreliable for ballistic applications.

Piezoelectric polymer transducers are less fragile than piezoelectric ceramic transducers, and they are widely used as transducers. A prior effort was made to use the polymer variety of piezoelectric transducer for a fuse by preparing a stack of thin circular wafers which had been cut from polymer film and provided on opposite sides with respective positive and negative layers. This prior effort failed because it was not possible to establish a reliable electrical connection to all positive layers along one path and a separate reliable connection to all negative layers along another path.

Moreover, a transducer formed by pleating a continuous strip of polymer film having negative and positive layers on its opposite sides often failed at the bends between folds.

DESCRIPTION OF THE INVENTION

In accordance with the present invention, a piezoelectric energy storage and generation device comprises an elongated strip of piezoelectric polymer film having metalized first and second layers of opposite polarity on its respective opposite sides. The strip is pre-folded end to end to double thickness, thereby placing one end half of the first or positive layer into mutually contacting relationship with the other end half of the first layer. The pre-folded strip is then pleated end to end in a zigzag pattern a plurality of times, with adjacent folds in the second or negative layer being paired and placed in mutually contacting relationship. The end plates at the respective opposite ends of the pre-folded and pleated strip are assembled together in a stacked relationship, and the end plates are electrically connected respectively to the first (positive) and second (negative) layers. A diode or diode bridge having cathode and anode terminals is connected to the respective negative and positive layers, and the assembly is embedded in an epoxy potting material having insulating properties.

The metalized first and second layers are each patterned as a series of abutting circles, each with an optional central hole and extending longitudinally of said strip. The circles overlie one another in the strip, and also when the strip is pre-folded, pleated, stacked and assembled. The patterning of the layers is preferably produced by printing on the base film; however, it is also possible to provide a thin metal layer by a sputtering process.

The time-delay fuse herein disclosed, approximately 0.360 inches in diameter and 0.156 inches in length, may be used in a projectile to convert mechanical energy derived from the initial firing into a minimum of 2500 ergs of electrical energy which is maintained at that level for at least four seconds and later used

BRIEF DESCRIPTION OF THE DRAWINGS

FIG. 4 is a reduced, longitudinal sectional view of the film strip of FIG. 3 after pre-folding;

FIG. 5 is a conceptional illustration of the fuse of FIG. 1 on an enlarged scale, showing how the pre-folded film strip of FIG. 4 is pleated in zigzag fashion, with a large bending radius between the folds, and the central apertures are kept in alignment during stacking assembly; and FIG. 6 is a longitudinal, cross-sectional view of the strip of piezoelectric polymer film showing metalized layers on its opposite surfaces.

DESCRIPTION OF THE PREFERRED EMBODIMENT

Figure 1:
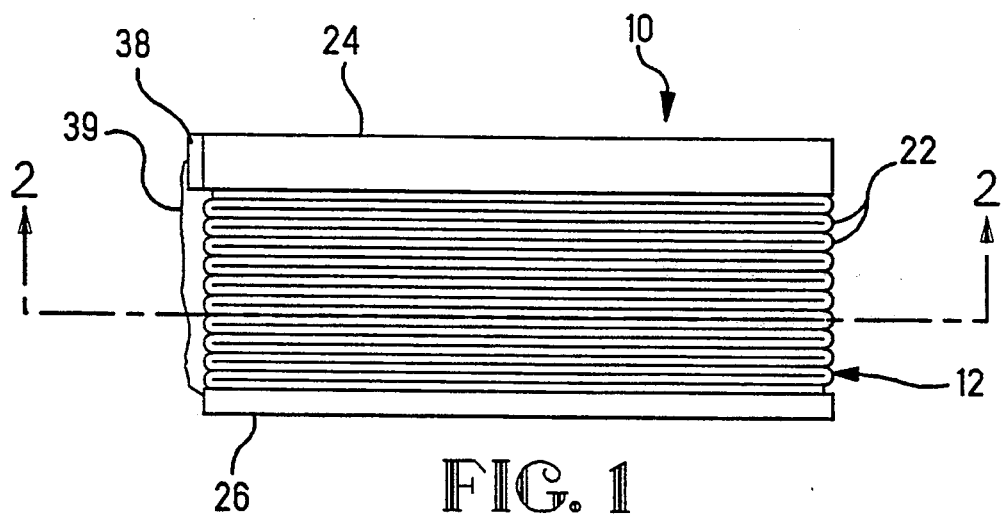
FIG. 1 is an elevational view of a fuse constructed and assembled according to the invention.
Figure 2:
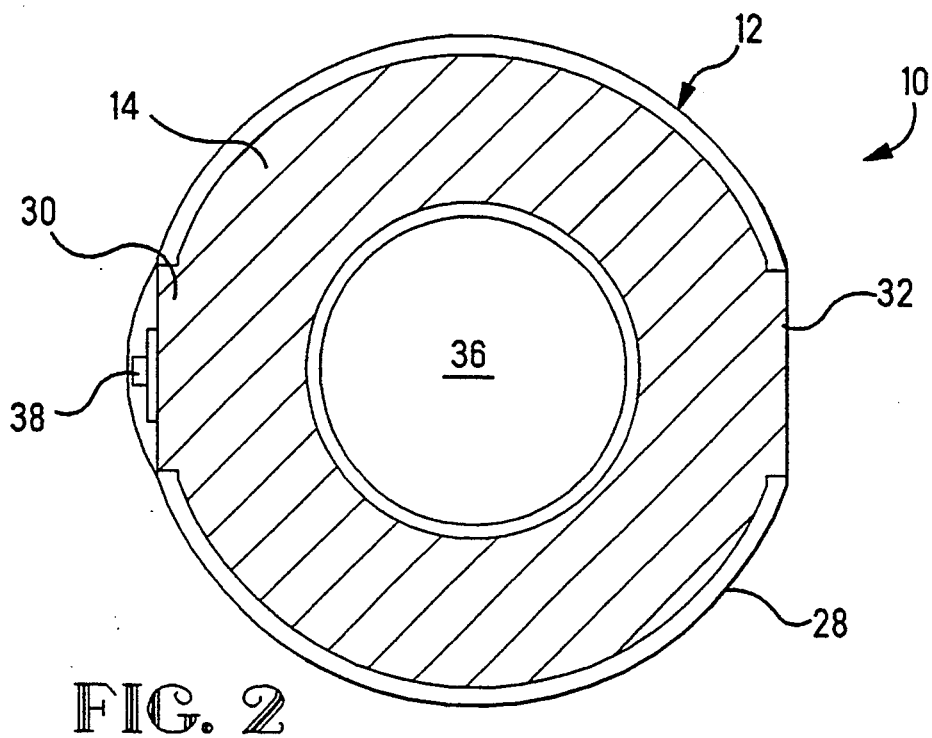
FIG. 2 is a sectional view taken along line 2—2 of FIG. 1 in the direction of the arrows.

The piezoelectric energy storage and generation device of the present invention is shown in the drawings in its preferred form as a time-delay fuse 10 for a ballistic projectile. A fuse of this type may be approximately 0.360 inches in diameter and 0.156 inches in length, but the invention is not so limited. After firing of the projectile it remains unarmed initially; and mechanical energy imparted by initial firing is converted to electrical energy and stored for later use to energize detonation.

The fuse 10 shown in the drawings is made from an elongated strip 12 of piezoelectric polymer film having metalized first and second layers 14, 16 of opposite polarity on the respective opposite sides thereof. The strip 12 is uniquely pre-folded end to end to double thickness, thereby placing one end half 18 of the first or positive layer 14 into mutually contacting relationship with the other end half 20 of the first layer 14.

The pre-folding of the strip 12 end to end places the two mutually contacting thicknesses of the first or positive layer 14 at the core, and the two spaced-apart and outwardly facing thicknesses of the second layer 16 on the outside of the pre-folded strip 12. It is to be noted that chances of an electrical short between the layers 14 and 16 are greatly reduced in comparison with the prior practice configuration of stacked, discrete, circular wafers having leads jumpered or connected to their surfaces of common polarity, as previously described herein. Pre-folding according to the invention, as described, is well suited to joining the sides of the adjacent circle patterns continuously throughout the length of each of the layers 14, 16, on the strip 12, thus avoiding the necessity of individual leads or jumpers and their fragile connections which increase the risk of failure.

A further advantage of pre-folding the strip 12 is that the bend radius required for pleating a strip of double thickness is twice that required for pleating a strip of single thickness, thus reducing the sharpness of the bend at each hinge joint between circle patterns and thereby greatly reducing the risk of failure from bending stress.

The pre-folded strip 12 is pleated end to end in a zigzag pattern a plurality of times, as shown, forming folds 22 in such a way that adjacent surfaces in the second or positive layer 16 are paired and placed in mutually contacting relationship.

Also provided, as shown, are end plates 24, 26 at the rod and bottom of the assembly, respectively, adhesively secured to the opposite ends of the strip 12 to provide reinforcement, rigidity, electrical interface points, and a rugged quality to the device. The pre-folded and pleated strip 12 is assembled, as shown, with the end plates 24, 26 in stacked relationship one above the other.

The end plates 24, 26 are electrically connected respectively to said first and second layers 14, 16 by a silver adhesive joint. The layers 14, 16 are preferably printed with silver ink, but alternatively a thin metal film may be applied by a sputtering process, in which case the electrical connection is preferably made by a silver adhesive joint. If the negative and positive layers 14, 16 are thin metal films, produced by sputtering and etching, the electrical connection may be made again by conductive adhesive.

Figure 3:
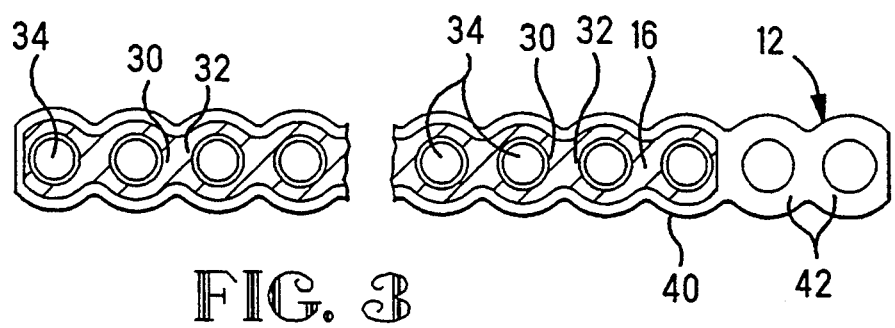
FIG. 3 is a plan view of a strip of piezoelectric polymer film, with portions broken away, showing a metalized layer on one surface thereof in an adjoining circles pattern, die cut with a central aperture for each circle and a margin between the edge of the layer and the edge of the film.

When assembled as shown, the folded and pleated strip 12 of the device 10 appears to be a stack of circular wafers 28, approximately 69 in number, hinged together at two opposite arcuate sides 30, 32 and having a central aperture 34, as individually illustrated in FIG. 3. In strip form, prior to assembly, the patterned, metalized layers 14, 16 are seen as a series of abutting circles arrayed lengthwise or longitudinally of the strip 12. The circle patterns of the two layers 14, 16 are printed with silver ink on the base film in position to overlie one another, that is, one circle of one layer over one circle of the other layer; and the positional relationship of the circles remains one above the other after folding, pleating and placement in stacked assembly. The aligned optional central apertures 34 of the stacked assembly form an optional central hollow core 36 which may be employed to house an impact switch or other associated electronic devices.

For storing electrical energy converted from mechanical energy developed during the initial firing operation, a diode 38 is provided, its anode and cathode terminals electrically connected respectively to end plates 24, 26 by a silver epoxy connection. An electrical lead 39 connects the diode 38 and the bottom plate 26.

It is preferred that manufacturing of the fuse 10 proceed by printing the abutting circle pattern on the film strip 12, then die cutting the strip 12 with its layers 14, 16 to the configuration shown in the drawing, next pre-folding the strip 12 end to end, adhesively securing the end plates 24, 26 to ends of pre-folded strip 12, and pleating the strip in a zigzag pattern to produce the stack.

As shown in FIG. 3, the conductive layer 16 printed on strip 12 is a longitudinal series of circular panels or folds terminating with a fold designated by the numeral 40. Not shown in FIG. 3 is the underlying conductive layer 14 printed on the opposite surface of the strip which also terminates with fold 40. The strip 12 continues as shown beyond fold 40 with two unprinted folds 42 which are of polymer material and free of any conductive material. There the strip 12 ends. It is desirable in actual practice to fold back the the two unprinted folds 42 in longitudinal direction so that they overlay the last two printed folds including fold 40. The pleating operation is then completed so that the last printed fold 40 is at the top of the pleated stack in electrical contact with end plate 24, and the two unprinted folds 42 are enclosed in the stack immediately below the last printed fold 40, in which position the folds 42 provide extra electrical insulation between the topmost end plate 24 and the exposed surfaces of layer 16 facing outwardly of the pleated assembly.

An epoxy potting compound is partially applied at this stage, followed by connecting the diode 38 directly to the top end plate 24 and through a conductor 39 to the bottom end plate 26. The embedding and enclosure of the assembly is completed with epoxy potting compound to produce an insulating shell, not shown.

The fuse construction proposed by the present invention meets the functional requirements set forth, and is also rugged, dependable and economical to produce.

Although illustrated in a preferred embodiment, the invention is susceptible to variations which will occur to persons skilled in the art and not depart from the scope of the appended claims.

What is claimed is:

1. A piezoelectric energy storage and generation device comprising:
   (a) an elongated strip of piezoelectric polymer film having metalized first and second layers of opposite polarity on the respective opposite sides thereof;
   (b) said strip being pre-folded end to end to double thickness, thereby placing one end half of said first layer into mutually contacting relationship with the other end half of said first layer;
   (c) said pre-folded strip being pleated end to end in a zigzag pattern a plurality of times, with adjacent folds in said second layer being paired and placed in mutually contacting relationship; and
   (d) end plates at the respective opposite ends of said pre-folded and pleated strip, assembled therewith in stacked relationship, and electrically connected respectively to said first and second layers;
   wherein said metallized first and second layers are each patterned as a series of abutting circles extending longitudinally of said strip, overlying one another in said strip, and when said strip is pre-folded, pleated, stacked and assembled.

2. A device according to claim 1 further including a diode having cathode and anode terminals connected to the respective first and second layers of piezoelectric polymer from.

3. A device according to claim 2 wherein said pre-folded, pleated strip is assembled with said diode in said stacked relationship and the assembly is coated with potting material.

4. A device according to claim 1 wherein said circles are formed respectively about a longitudinal series of holes in said strip.

5. A device according to claim 1 wherein the patterning of said layers is a metalized deposit.

6. A device according to claim 1 wherein the patterning of said layers is the remainder of an etched coating.

7. A device according to claim 1 wherein the patterning of said layers id printed in metal ink.

8. A device according to claim 1 further including joints of silver adhesive providing the electrical connection between the respective end plates and said first and second layers.

9. A time-delay fuse in accordance with the device of claim 1 for use in a projectile to convert mechanical energy derived from the initial firing into electrical energy stored for later use in energizing a detonation, approximately 0.360 inches in diameter and 0.156 inches in length.

* * * * *